(12) United States Patent
Mauchle et al.

(10) Patent No.: US 9,834,391 B2
(45) Date of Patent: Dec. 5, 2017

(54) POWDER FEEDING DEVICE, IN PARTICULAR FOR COATING POWDER

(71) Applicant: GEMA SWITZERLAND GMBH, St. Gallen (CH)

(72) Inventors: Felix Mauchle, Abtwil (CH); Hanspeter Vieli, Goldach (CN)

(73) Assignee: GEMA SWITZERLAND GMBH, St. Gallen (CH)

( * ) Notice: Subject to any disclaimer, the term of this patent is extended or adjusted under 35 U.S.C. 154(b) by 53 days.

(21) Appl. No.: 14/899,102

(22) PCT Filed: May 26, 2014

(86) PCT No.: PCT/EP2014/060854
§ 371 (c)(1),
(2) Date: Dec. 16, 2015

(87) PCT Pub. No.: WO2014/202342
PCT Pub. Date: Dec. 24, 2014

(65) Prior Publication Data
US 2016/0368717 A1 Dec. 22, 2016

(30) Foreign Application Priority Data
Jun. 19, 2013 (DE) .................. 10 2013 211 550

(51) Int. Cl.
*B65G 53/28* (2006.01)
*B65G 53/66* (2006.01)
(Continued)

(52) U.S. Cl.
CPC ............ *B65G 53/66* (2013.01); *B05B 7/1459* (2013.01); *B65G 53/14* (2013.01); *B65G 53/28* (2013.01); *F16K 7/07* (2013.01); *G05D 7/012* (2013.01)

(58) Field of Classification Search
CPC ............ B65G 53/14; B65G 53/28; F16K 7/07
(Continued)

(56) References Cited

U.S. PATENT DOCUMENTS 2,946,488 A * 7/1960 Kraft .................. B01F 15/0475
222/134
3,260,285 A * 7/1966 Vogt ......................... B65B 1/16
141/102

(Continued)

FOREIGN PATENT DOCUMENTS

| DE | 19959473 A1 | 6/2001 |
| DE | 10353968 A1 | 7/2005 |

(Continued)

OTHER PUBLICATIONS

English translation of International Preliminary Report on Patentability dated Dec. 19, 2015, for corresponding PCT Application No. PCT/EP2014/060854.

(Continued)

*Primary Examiner* — Joseph Dillon, Jr.
(74) *Attorney, Agent, or Firm* — Kinney & Lange, P.A.

(57) ABSTRACT

A powder feeding device, in particular for coating powder, is disclosed. The powder feeding device includes a dense phase powder pump which has at least one conveying chamber with a powder inlet valve and a powder outlet valve. Furthermore, a control device is provided for selectively operating the dense phase powder pump in a powder conveying more or a flushing operating mode. The powder inlet valve and the powder outlet valve of the dense phase powder pump are configured in each case as a pneumatically actuable compression valve which can be closed when an actuating pressure is applied. The control device is configured to set the pressure value of the actuating pressure which is selected for closing the powder inlet valve and/or powder outlet valve depending on the respective operating mode of (Continued)

Figure 1:
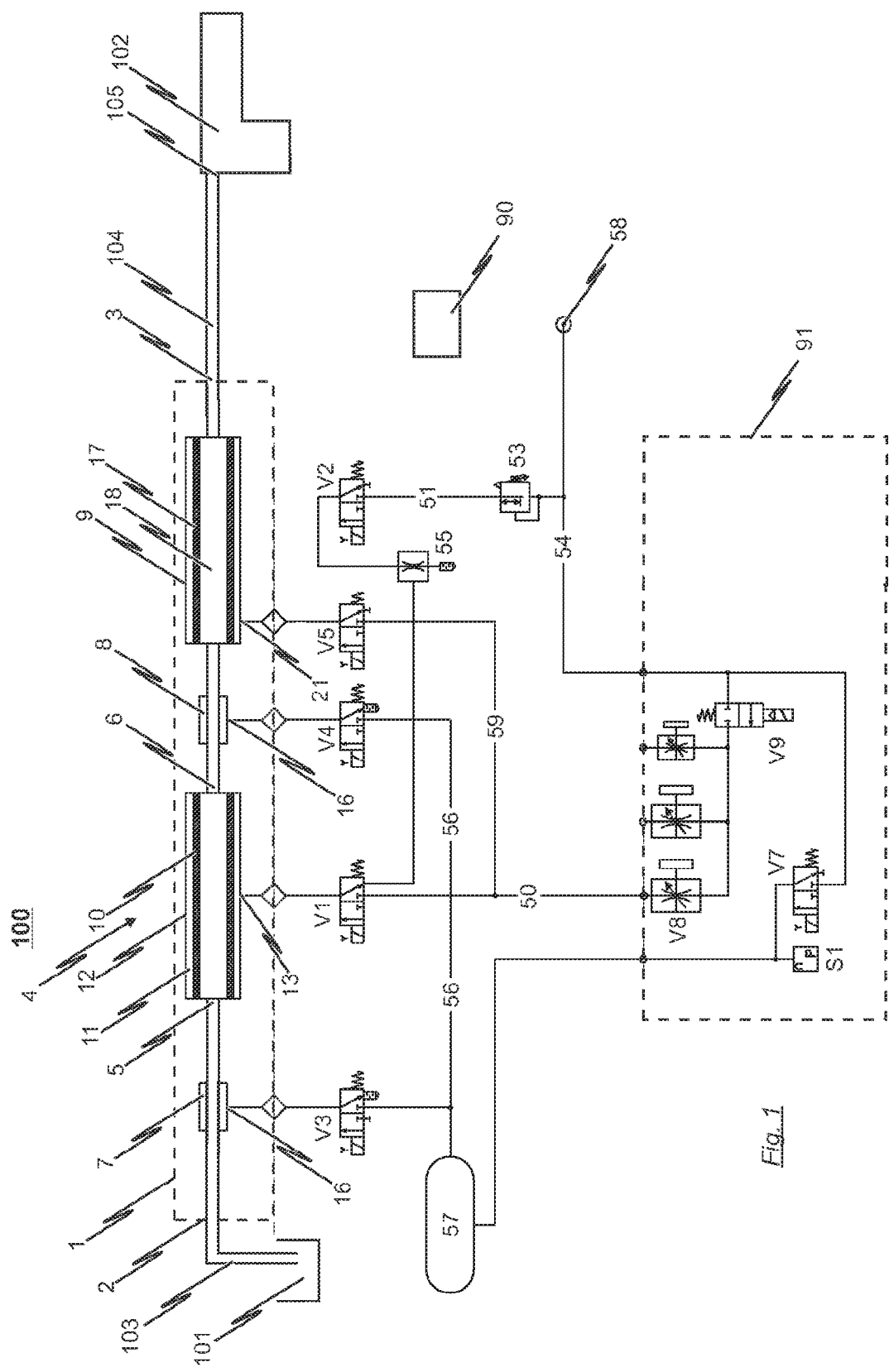

the dense phase powder pump and/or depending on a pressure which prevails in the conveying chamber.

20 Claims, 3 Drawing Sheets

(51) Int. Cl.
    *B05B 7/14*     (2006.01)
    *B65G 53/14*     (2006.01)
    *F16K 7/07*     (2006.01)
    *G05D 7/01*     (2006.01)

(58) Field of Classification Search
    USPC ............ 406/10, 14, 19, 50, 90, 91, 192, 197
    See application file for complete search history.

(56) References Cited

U.S. PATENT DOCUMENTS

| | | | | |
|---|---|---|---|---|
| 3,649,081 | A * | 3/1972 | Johnson | H05K 13/027 406/85 |
| 3,788,368 | A * | 1/1974 | Geng | B65B 63/028 141/286 |
| 3,932,065 | A * | 1/1976 | Ginsberg | F04B 7/0275 137/627.5 |
| 3,936,028 | A * | 2/1976 | Norton | F16K 7/07 251/43 |
| 4,125,125 | A * | 11/1978 | Ezekoye | F16K 7/07 137/315.07 |
| 4,284,032 | A * | 8/1981 | Moos | B05B 7/1404 118/308 |
| 4,303,222 | A * | 12/1981 | Campbell | F16K 7/06 251/252 |
| 4,521,165 | A * | 6/1985 | Handleman | B65G 53/08 406/50 |
| 4,893,966 | A * | 1/1990 | Roehl | B65G 53/32 137/624.14 |
| 5,336,051 | A * | 8/1994 | Tamari | A61M 1/0031 417/19 |
| 5,704,990 | A * | 1/1998 | Krambrock | B65G 53/521 134/22.12 |
| 6,283,680 | B1 * | 9/2001 | Vidal | B65G 53/32 222/207 |
| 6,447,215 | B1 * | 9/2002 | Wellmar | B65G 53/66 406/11 |
| 6,598,803 | B1 * | 7/2003 | Haas | B05B 7/1404 239/407 |
| 7,144,213 | B2 * | 12/2006 | Cartwright | G05D 7/0652 406/192 |
| 7,150,585 | B2 * | 12/2006 | Kleineidam | B05B 7/1459 406/127 |
| 7,241,080 | B2 * | 7/2007 | Klobucar | B05B 7/1459 406/106 |
| 7,410,329 | B2 * | 8/2008 | Simontacchi | B65G 53/28 406/109 |
| 7,413,388 | B2 * | 8/2008 | Krebs | B65G 53/08 406/120 |
| 7,452,166 | B2 * | 11/2008 | Von Keudell | B05B 7/1459 406/137 |
| 7,530,768 | B2 * | 5/2009 | Durr | B05B 7/1459 406/151 |
| 7,731,456 | B2 * | 6/2010 | Fulkerson | B05B 7/1454 406/11 |
| 8,057,129 | B2 * | 11/2011 | Kleineidam | B05B 7/1459 406/146 |
| 8,231,310 | B2 * | 7/2012 | Sanwald | B05B 7/1459 406/127 |
| 8,491,226 | B2 * | 7/2013 | Kleineidam | B05B 7/1459 406/13 |
| 8,640,644 | B2 * | 2/2014 | Mauchle | B05B 7/1459 118/308 |
| 9,085,065 | B2 * | 7/2015 | Reilley | B24C 9/006 |
| 2001/0003568 | A1 * | 6/2001 | Dietrich | B05B 7/1459 406/131 |
| 2003/0190200 | A1 * | 10/2003 | Hajima | B05B 7/1404 406/191 |
| 2006/0185671 | A1 * | 8/2006 | Durr | B05B 7/1459 128/203.15 |
| 2008/0187658 | A1 * | 8/2008 | Mauchle | B05B 7/1454 427/180 |
| 2010/0034600 | A1 * | 2/2010 | Sanwald | B05B 7/1459 406/28 |
| 2010/0212589 | A1 * | 8/2010 | Mauchle | B05B 7/1404 118/694 |
| 2010/0221421 | A1 * | 9/2010 | Mauchle | B05B 7/1459 427/180 |
| 2010/0243759 | A1 * | 9/2010 | Mauchle | B05B 7/1459 239/304 |
| 2010/0255975 | A1 * | 10/2010 | Mauchle | B04C 5/14 494/2 |
| 2011/0162579 | A1 | 7/2011 | Mauchle et al. | |

FOREIGN PATENT DOCUMENTS

| | | |
|---|---|---|
| DE | 102004007967 A1 | 9/2005 |
| DE | 102004008495 A1 | 9/2005 |
| DE | 102004052949 A1 | 5/2006 |
| DE | 102007005313 A1 | 8/2008 |
| DE | 102007045330 A1 | 4/2009 |
| DE | 102007046738 A1 | 4/2009 |
| DE | 102007046806 A1 | 4/2009 |
| DE | 102007048520 A1 | 4/2009 |
| DE | 102007049169 A1 | 4/2009 |
| DE | 102007049219 A1 | 4/2009 |
| EP | 1952892 A1 | 8/2008 |
| WO | 2009/037540 A2 | 3/2009 |

OTHER PUBLICATIONS

German Search Report dated Mar. 21, 2014, for corresponding German Application No. 10 2013 211 550.4.
Second Chinese Office Action, for Chinese Patent Application No. 201480035188.1, dated Feb. 22, 2017, 11 pages.

* cited by examiner

POWDER FEEDING DEVICE, IN PARTICULAR FOR COATING POWDER

The present invention relates to a powder feed device, particularly for coating powder, wherein the powder feed device comprises a dense phase powder pump and a control unit for selectively operating the dense phase powder pump in a powder feed operating mode or a flushing operating mode.

The powder feed device according to the invention is particularly suited to conveying coating powder from a first powder reservoir to a second powder reservoir of the powder feed device arranged downstream or a powder spray coating gun or other such similar device for spraying coating powder arranged downstream in the powder feed device.

The invention further relates to a method for conveying coating powder from a first powder reservoir to a second powder reservoir arranged downstream of the first powder reservoir or a powder spray coating gun or other such similar device for spraying coating powder arranged downstream of the first powder reservoir.

Powder feed devices of the type cited above are known in principle from the prior art. For example, German patent application No. 10 2013 205 895.0 relates to a powder feed device having a dense phase powder pump, wherein said dense phase powder pump is controlled by means of a control unit such that when the dense phase powder pump is in a powder feed operating mode, coating powder is conveyed from a first powder reservoir to a second powder reservoir arranged downstream of the first powder reservoir or to a powder spray coating gun arranged downstream respectively.

On the other hand, the EP 1 551 558 A1 published document, for example, relates to a dense phase powder pump comprising a first powder feed chamber and a second powder feed chamber arranged parallel to the first powder feed chamber. The two powder feed chambers of this dense phase powder pump known from the prior art are delimited both on the suction side as well as on the delivery side by a mechanically operating pinch valve arrangement.

It is necessary, particularly when changing colors (changing from one powder location to another powder location), for all the areas of the dense phase powder pump which come into contact with the coating powder as well as the powder lines leading to and from the dense phase powder pump to be cleaned exceptionally_thoroughly so that no powder particles of the first powder used will be mixed with the subsequently used powder. Even just a few powder particles can result in coating imperfections on objects to be coated which render the coating unusable. One only need think of for example changing from a black or red powder to a white powder or vice versa.

With this in mind, the present invention provides for the dense phase powder pump of the powder feed device to be selectively operable in a powder feed operating mode or a flushing operating mode. In the powder feed operating mode, the dense phase powder pump feeds powdered material, particularly coating powder, from a first powder reservoir to a downstream second powder reservoir of the powder feed device or a downstream powder spray coating gun or other such similar device for spraying coating powder of the powder feed device. Conversely, in the flushing operating mode, the dense phase powder pump as well as the powder lines connected to the dense phase powder pump are flushed with purge gas, particularly compressed air, and thus cleaned.

The present invention is to particularly solve the task of further developing a powder feed device of the type cited at the outset to the effect of enabling the powder feed device to operate more efficiently in the powder feed operating mode as well as in the flushing operating mode.

A further objective of the invention is that of structurally configuring a simpler powder feed device of the type cited at the outset and thereby optimizing the operation of said powder feed device.

With regard to the device, the task underlying the invention is solved by the subject matter of independent claim 1. Advantageous further developments are set forth in dependent claims 2 to 20.

Accordingly, the invention specifies in particular a powder feed device for conveying coating powder from a first powder reservoir to a second powder reservoir arranged downstream (with respect to the first powder reservoir) or to a powder spray coating gun or other such similar device for spraying coating powder arranged downstream, wherein the powder feed device comprises a dense phase powder pump having at least one feed chamber, one powder inlet valve and one powder outlet valve, and wherein the powder inlet valve and the powder outlet valve are each designed as a pneumatically operating pinch valve able to close upon application of an actuating pressure. According to the invention, a control unit is provided for selectively operating the dense phase powder pump in a powder feed operating mode or a flushing operating mode, wherein the control unit is designed to preferably automatically set the pressure of the actuating pressure selected to close the powder inlet valve and/or powder outlet valve and, even more preferentially, selectively automatically; i.e.:

- as a function of the respective operating mode of the dense phase powder pump;
- as a function of the pressure prevailing within the feed chamber;
- as a function of an amount of compressed carrier gas supplied to the feed chamber per unit of time in the powder feed operating mode; and/or
- as a function of an amount of coating powder conveyed by the dense phase powder pump per unit of time in the powder feed operating mode.

In accordance with the invention, it is in particular provided for the pressure of the actuating pressure selected to close the powder inlet valve and/or powder outlet valve in the powder feed operating mode of the dense phase powder pump to be lower than the pressure of the corresponding actuating pressure in the flushing operating mode of the dense phase powder pump. This measure ensures that compressed purge gas, in particular compressed purge air, can be introduced into the feed chamber during the flushing operating mode of the dense phase powder pump without the risk of the compressed purge gas being able to escape through the closed powder inlet valve and/or closed powder outlet valve. This thereby in particular ensures that sufficient flushing pressure can always develop.

According to a further aspect of the present invention, it is provided for the control unit to be designed so as to automatically, and even more preferentially, selectively automatically, set the pressure of a compressed gas to be introduced into the feed chamber and/or the amount of compressed gas to be introduced into the feed chamber per unit of time as a function of the operating mode of the dense phase powder pump. It is thus for example conceivable for compressed carrier gas, particularly compressed carrier air, to be introduced into the feed chamber during the powder feed operating mode of the dense phase powder pump, wherein said compressed carrier gas is at a first pressure level. Compressed purge gas, particularly compressed purge air, can then be introduced into the feed chamber during a flushing operating mode of the dense phase powder pump, wherein a higher (second) pressure level compared to the first pressure level is then selected. The dense phase powder pump and the powder lines connected to the dense phase powder pump being able to be flushed with compressed purge gas at a relatively high pressure level during the flushing operating mode optimizes cleaning efficiency. On the other hand, setting the pressure value selected for the actuating pressure to close the powder inlet valve and/or powder outlet valve as a function of the respective operating mode of the dense phase powder pump, or as a function of the pressure prevailing within the feed chamber respectively, ensures that even the closed powder inlet valve and/or closed powder outlet valve will not let any compressed purge gas pass through when a correspondingly higher pressure is selected for the compressed purge gas.

According to a further aspect of the present invention, it is provided for the control unit to be designed to preferably automatically, and even more preferentially, selectively automatically, set the pressure of the actuating pressure selected to close the powder inlet valve and/or powder outlet valve as a function of an amount of compressed carrier gas supplied to the feed chamber per unit of time in the powder feed operating mode and/or as a function of an amount of coating powder conveyed by the dense phase powder pump per unit of time in the powder feed operating mode. This measure thus allows the actuating pressure of the pinch valves to be adapted as a function of the output of the dense phase powder pump. It is thus particularly possible to effectively use the dense phase powder pump for different powder feed rates. The dense phase powder pump can also be used unproblematically for particular types of powder readily prone to powder blockage.

To be understood by the term "powder feed operating mode" as used herein is an operating mode of the dense phase powder pump in which a portion of powder is alternatingly sucked into the feed chamber of the dense phase powder pump through the opened powder inlet valve while the powder outlet valve is closed and the portion of powder previously sucked into the feed chamber is discharged through the open powder outlet valve by the introduction of compressed carrier gas into the feed chamber while the powder inlet valve is closed.

The term "flushing operating mode" refers in particular to an operating mode in which the powder inlet valve and/or the powder outlet valve is open while compressed purge gas is introduced into the feed chamber simultaneously or after a delay.

According to one aspect of the present invention, the control unit comprises a pressure control designed to set a pressure value for a compressed carrier gas to be introduced into the feed chamber during the powder feed operating mode.

In one particularly preferential realization of the pressure control, same comprises at least one throttle device in order to be able to set the cross-sectional flow through a compressed gas line fluidly connected or connectable to the feed chamber of the dense phase powder pump on a localized basis. It is hereby particularly conceivable for the throttle device to comprise at least one throttle valve, particularly in the form of a regulating valve, which is designed to set a pressure for the compressed carrier gas to be introduced into the feed chamber during the powder feed operating mode and/or to set the amount of compressed carrier gas to be introduced into the feed chamber during the powder feed operating mode per unit of time. Alternatively or additionally hereto, the at least one throttle valve is preferably further designed so as to set a pressure for the compressed purge gas to be introduced into the feed chamber during the flushing operating mode and/or the amount of compressed purge gas to be introduced into the feed chamber during the flushing operating mode per unit of time.

In a particularly easy to realize and yet effective manner, the throttle valve comprises a fixed valve part, particularly in the form of a valve seat, and a valve part which is movable relative thereto and can thereby be regulated to change the opening width of a throttle duct of the at least one throttle valve, whereby the geometrical form of the adjustable valve part is selected such that the throttle valve exhibits a flow characteristic having at least two substantially linear ranges. The at least two substantially linear ranges of the flow characteristic thereby exhibit different predefined gradients.

In conjunction hereto, it is conceivable for the control unit to be designed to control the throttle valve such that the compressed gas flow rate through the throttle valve is in one first substantially linear range of the flow characteristic during the powder feed operating mode and to control the throttle valve during the flushing operating mode such that the compressed gas flow rate through the throttle valve is in a second substantially linear range of the flow characteristic.

The following will make reference to the accompanying drawings in describing the invention in greater detail based on exemplary embodiments.

Figure 2:
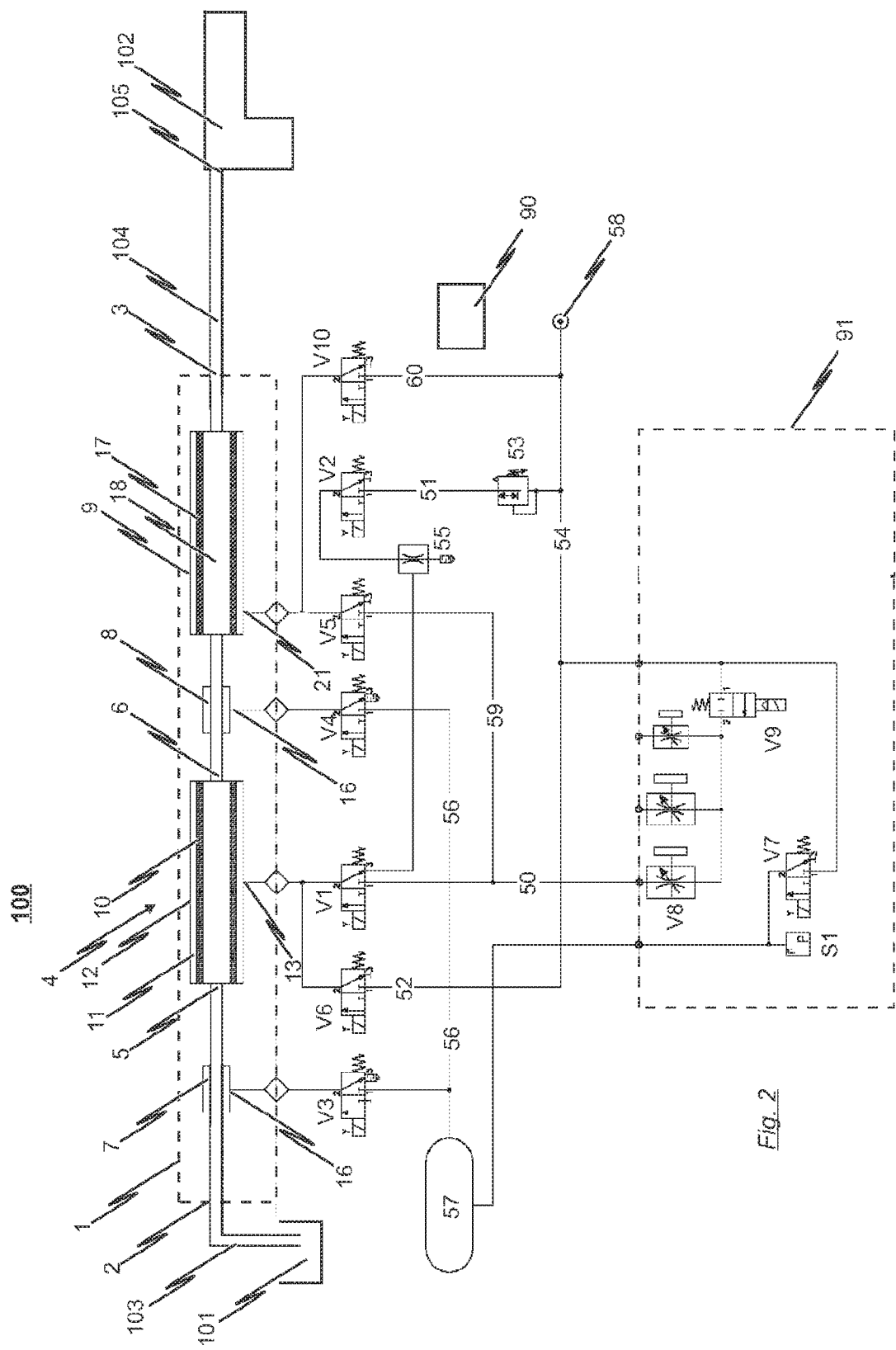
Figure 3:
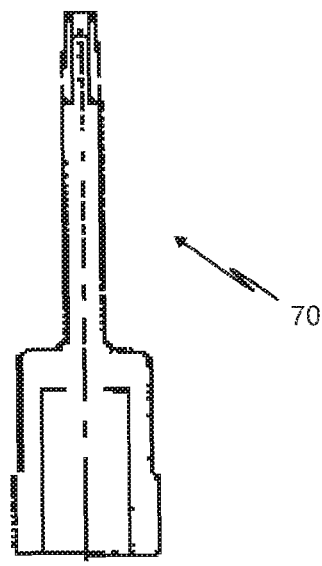
Figure 4:
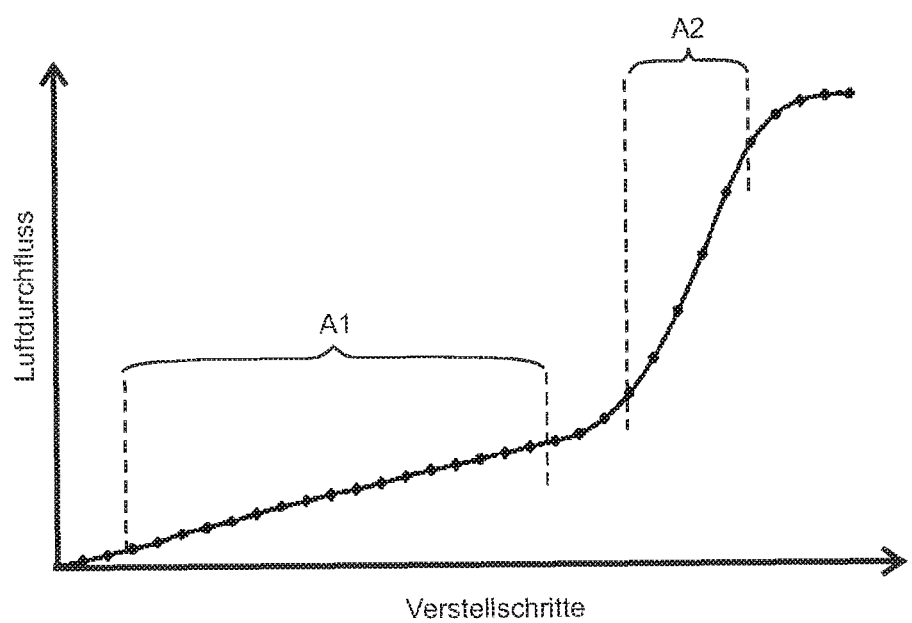

The drawings show:

FIG. 1 a schematic depiction of a first exemplary embodiment of a powder feed device according to the present invention;

FIG. 2 a schematic depiction of a first exemplary embodiment of a powder feed device according to the present invention;

FIG. 3 a valve needle of a throttle device used as pressure control in the exemplary embodiment of the inventive powder feed device; and FIG. 4 a flow characteristic of a throttle valve comprising a valve needle in accordance with FIG. 2.

The following will reference the depiction provided in FIG. 1 in describing a first exemplary embodiment of the powder feed device 100 according to the invention. The powder feed device 100 serves in particular to convey coating powder from a first powder reservoir 101 to a powder spray coating gun 102 arranged down-stream of the powder feed device 100. Another device for spraying coating powder onto an object to be coated or also a second powder reservoir can however also be employed in place of the powder spray coating gun 102.

The powder feed device 100 according to the exemplary embodiment depicted in FIG. 1 comprises at least one (exactly one in the FIG. 1 drawing) dense phase powder pump 1. The powder inlet 2 of the dense phase powder pump 1 is connected or connectable downstream to the first powder reservoir 101 by means of a powder line 103, particularly by means of a suction tube or the like. A powder outlet 3 is provided at the opposite end region of the dense phase powder pump 1 which is connected or connectable to a coating powder inlet 105 of the powder spray coating gun 102 by means of a powder line 104, particularly by means of a powder hose.

Although not explicitly depicted in FIG. 1, both the powder inlet 2 as well as also the powder outlet 3 of the dense phase powder pump 1 in the exemplary embodiment of the powder feed device 100 are configured as hose connectors to which the corresponding powder line 103 or 104 can be attached and fixed by means of a hose clip. However, other embodiments for the powder inlet 2 and/or powder outlet 3 of the dense phase powder pump 1 are of course also conceivable.

The dense phase powder pump 1 employed in the exemplary embodiment of the powder feed device 100 depicted in FIG. 1 is characterized among other things by the fact of it being designed as a single-chamber dense phase powder pump, wherein just one single powder feed chamber 4 is provided for conveying the coating powder from the first powder reservoir 101 to the powder spray coating gun 102 or respectively to another device for spray coating objects or to a further powder reservoir. However, the invention is not limited to powder feed devices making use of a single-chamber dense phase powder pump. The invention in fact also encompasses powder feed devices which make use of multi-chamber dense phase powder pumps.

The dense phase powder pump 1 used in the powder feed device 100 depicted schematically in FIG. 1 is, however, designed as a single-chamber dense phase powder pump, wherein just one single powder feed chamber 4 is provided to convey coating powder from the first powder reservoir 1 to the powder spray coating gun 102 or respectively to another device for spray coating objects or to a further powder reservoir. Said powder feed chamber 4 has a powder inlet 5 on a first end region facing the powder inlet 2 of the dense phase powder pump 1. The powder feed chamber 4 further has a powder outlet 6 facing the powder outlet 3 of the dense phase powder pump. A powder inlet valve 7 is arranged directly adjacent the powder inlet 5 of the powder feed chamber 4 such that said powder inlet valve 7 is situated between the powder inlet 5 of the powder feed chamber 4 and the powder inlet 2 of the dense phase powder pump 1. A powder outlet valve 8 is similarly arranged directly adjacent the powder outlet 6 of the powder feed chamber 4.

When a dense phase powder pump designed as a single-chamber dense phase powder pump is used in the powder feed device 100, it is advantageous for the powder outlet valve 8 at the powder outlet region of the dense phase powder pump 1 to not be arranged directly between the powder outlet 6 of the powder feed chamber 4 and the powder outlet 3 of the dense phase powder pump 1. Instead, it is advantageous in this embodiment for another auxiliary compressed air inlet device 9 to be arranged between the powder outlet valve 8 and the powder outlet 3 of the dense phase powder pump 1. As will be described in greater detail below, this auxiliary compressed air inlet device 9 serves in feeding additional compressed carrier gas into the powder path between the powder outlet valve 8 and the powder outlet 3 of the dense phase powder pump 1 when needed.

It is to be noted at this point that it is not mandatory for the auxiliary compressed air inlet device 9 to be arranged between the powder outlet valve 8 and the powder outlet 3 of the single-chamber dense phase powder pump 1. The effects able to be realized with the auxiliary compressed air inlet device 9, which will be described in greater detail below, can also be realized when an auxiliary compressed air inlet device 9 is arranged downstream of the powder outlet 3 of the dense phase powder pump 1.

As can be seen particularly from the representation provided in FIG. 1, the powder inlet 2 of the dense phase powder pump 1, the powder inlet valve 7, the powder inlet 5 of the powder feed chamber 4, the powder feed chamber 4, the powder outlet 6 of the powder chamber 4, the auxiliary compressed air inlet device 9 as well as the powder outlet 3 of the dense phase powder pump 1 all lie along a common longitudinal axis. In other words, the powder inlet 2 of the dense phase powder pump 1 is situated at the opposite end of the powder outlet 3 of the dense phase powder pump 1.

It is to be emphasized at this point that the invention is not limited to powder feed devices employing dense phase powder pumps in which the powder inlet 2 and powder outlet 3 are arranged at opposite end regions. The invention is instead also suited to dense phase powder pumps having their powder inlet and powder outlet provided on one and the same end region of said dense phase powder pumps.

The following will describe the design and operation of the powder feed chamber 4 of the dense phase powder pump 1 as employed in the embodiment of the inventive powder feed device 100 schematically depicted in FIG. 1 in greater detail.

As can be seen particularly from the FIG. 1 schematic representation, the powder feed chamber 4 is formed by the cylindrical wall of a tube-like filter 10 between its powder inlet 5 and its powder outlet 6. This tube-like filter 10 is permeable to air but not, however, to coating powder and can consist for example of sintered material. The filter 10 configured as a filter tube is enclosed within an intermediate chamber 11, its outer face being limited by the housing of the powder feed chamber 4.

An air exchange opening 13 fluidly connected to a control valve V1 (here: solenoid valve) feeds through to the housing. The powder feed chamber 4 can be alternately supplied with compressed carrier air from a compressed air supply line 50 or respectively subjected to a vacuum or the negative pressure of a vacuum source via control valve V1.

In the embodiment of the inventive powder feed device 100 depicted schematically in FIG. 1, the vacuum source comprises an injector 55 which is supplied with compressed injector air by a compressed air supply line 51, or a compressed air source 58 respectively, for example by means of a pressure regulator 53 and a further control valve V2 (here: solenoid valve).

In the embodiment depicted, the compressed air source 58 is designed as an inlet pressure regulator to regulate inlet pressure at a supply connection (not shown) to an internal constant supply pressure of 6 to 8 bar.

Regardless of the specific embodiment of the compressed air source 58, it is hereby of advantage for same to be a device able to provide a predefined or definable constant supply pressure.

In order for the dense phase powder pump 1 to be able to aspirate coating powder from the first powder reservoir 101 through the powder inlet 2 of the dense phase powder pump 1 during a suction phase when in powder feed operating mode, the powder outlet valve 8 arranged at the powder outlet 6 of the powder feed chamber 4 is closed and the powder inlet valve 7 arranged between the powder inlet 2 of the dense phase powder pump 1 and the powder inlet 5 of the powder feed chamber 4 is open. Simultaneous with the powder outlet valve 8 and powder inlet valve 7 being actuated, or immediately thereafter, the powder feed chamber 4 is fluidly connected to the vacuum source via the control valve V1 and the thereby connected air exchange opening 13 such that there is a negative pressure in the powder feed chamber 4 and coating powder can be sucked in from the first powder reservoir 101.

After coating powder has been sucked into the powder feed chamber 4, a change occurs from the suction phase to the expulsion phase of coating powder from the feed chamber 4. To this end, powder inlet valve 7 is closed and powder inlet valve 8 opened while the control valve V1 provides a fluid connection between the air exchange opening 13 and the compressed air supply line 50 so that the portion of coating powder previously sucked into the powder feed chamber during the suction phase can be expelled through the open powder outlet valve by the compressed carrier air supplied via the air exchange opening 13. As can be noted from the pneumatics of FIG. 1, the compressed air supply line 50 is fluidly connected to the compressed air supply source 58 in this embodiment by means of pressure control 91.

Thereafter, the operating phase of aspirating coating powder via the powder inlet 2 of the dense phase powder pump 1 and through the open powder inlet valve 7 then follows again. This change in operating phase is continually repeated in the dense phase powder pump's powder feed operating mode.

The term "pump cycle" herein refers to a cycle consisting of a suction phase and an expulsion phase.

In the powder feed device 100 according to the invention, the valves arranged at the inlet and outlet sides of the powder feed chamber 4 (powder inlet valve 7, powder outlet valve 8) are in each case configured as pinch valves. In the embodiment depicted schematically in FIG. 1, each of the powder inlet and powder outlet valves 7, 8 configured as pinch valves respectively comprises a flexible, elastic hose which serves as a valve channel. Compressed actuating air within the pressure chamber surrounding the flexible, elastic hose can squeeze the flexible elastic hose in order to close the respective valve (powder inlet valve 7, powder outlet valve 8).

For this purpose, a respective air exchange opening 16 connected to a corresponding control valve V3, V4 (here: solenoid valve) is respectively provided in each pressure chamber. The control valves V3, V4 serve to alternately subject the pressure chambers of the two powder inlet/powder outlet valves 7, 8 each of pinch valve design to positive pressure via a compressed air supply line 56.

As schematically depicted in FIG. 1, the compressed air supply line 56 can be connected to a pressure accumulator 57. In the embodiment according to FIG. 1, the pressure accumulator 57 itself is connected to the compressed air source 58 via the pressure control 91. However, it is of course also conceivable for the compressed air supply line 56 to be connected directly to the compressed air source 58 (i.e. without the interposition of the pressure accumulator 57).

The flexible, elastic hose of the powder inlet valve 7 and/or powder outlet valve 8 of a pinch valve design preferably has such an elasticity or residual stress that it automatically extends again once the pressure of the compressed actuating air in the pressure chamber is eliminated, thereby opening the respective valve. In order to support the opening of the pinch valve and thus increase the feasible switching frequency of the dense phase powder pump 1, it is alternatively or additionally conceivable to selectively subject the pressure chambers to a negative pressure via the respective air exchange openings 16.

In order for the single-chamber dense phase powder pump 1 to achieve a homogeneous powder flow without disruptive pulsation downstream of the powder outlet 3 in the powder feed device 100 depicted schematically in FIG. 1, the auxiliary compressed air inlet device 9 mentioned above is employed, which in the depicted exemplary embodiment is provided at the outlet of the powder outlet valve 8, or the powder outlet 3 of the dense phase powder pump 1 respectively, so as to be able to feed additional compressed carrier air into the powder path there as needed.

In the exemplary embodiment of the inventive powder feed device 100 depicted in FIG. 1, the auxiliary compressed air inlet device 9 employed comprises a filter tube 17 having a circumference of at least 180° (in the depicted embodiment a circumference of 360°) and a channel wall inner surface of at least 180° (in the FIG. 1 depicted embodiment a channel wall inner surface of 360°) along the powder path circumference at least over a partial length of the respective powder path.

In other words, in the embodiment of the inventive powder feed device 100 depicted schematically in FIG. 1, the auxiliary compressed air inlet device 9 comprises a filter tube 17 which surrounds the respective powder path by 360° at least for a partial length so that the portion of powder expelled from the powder feed chamber 4 of the dense phase powder pump 1 during a powder expulsion phase can flow through the filter tube channel 18 formed by the filter tube 17 homogeneously.

A compressed air chamber designed as an annular compressed air chamber in the embodiment depicted schematically in FIG. 1 encloses the filter tube 17 at its outer circumference. The compressed air chamber designed here as an annular compressed air chamber is enclosed at its radially inner circumference by the filter tube 17 and at its radially outer circumference distanced from the filter tube 17 by a housing. An air exchange opening 21 is provided in the housing by means of which compressed air from compressed air line 59 can flow as needed into the compressed air chamber via a control valve V5 (here: solenoid valve) and from there through the filter tube 17 into the filter tube channel 18.

Depending on the amount of additional compressed carrier air to be fed into the powder path per unit of time, the compressed air chamber and the filter tube channel 18 formed by filter tube 17 are to be of respectively large configuration.

As indicated above, the filter tube 17 of the auxiliary compressed air inlet device 9 consists of microporous material such that it is permeable to air but not, however, to coating powder. The filter tube 17 preferably consists of a sintered body, for example of metal or plastic, or a material mixture containing metal or plastic. It can furthermore consist of one material and/or be formed by a filter membrane.

Because of the relatively large surface of the filter tube 17 at its inner circumference, just a low volume of compressed air suffices to homogenize the axial powder distribution in the powder tube channel 18, and thus also in the powder path downstream the powder outlet 3 of the dense phase powder pump 1. Doing so can thus prevent or at least reduce pulsation of the powder flow in the powder path. Homogenization of the powder density longitudinally and over the cross section of the powder path can furthermore be achieved.

In accordance with the embodiment of the inventive powder feed device 100 depicted schematically in FIG. 1, the supplemental compressed air of the auxiliary compressed air inlet device 9 is fed in pulses at a pulse frequency equal to the frequency of the powder feed chamber 4 at which the powder feed chamber 4 dispenses powder portions. It is hereby provided for the two valves V1 and V5 to operate in phase opposition. Doing so ensures that the amount of compressed carrier air introduced into the powder path per unit of time in the powder feed operating mode of the dense phase powder pump 1 is constant over time. In other words, the same amount of compressed carrier air is always fed into the powder path at a constant powder feed rate during the powder feed operating mode.

As indicated above, the powder inlet valve 7 and the powder outlet valve 8 of the dense phase powder pump 1 used in the inventive powder feed device 100 are each designed as a pinch valve, since less coating powder can settle in pinch valves than in other types of valves and because powder deposits can be easily cleaned by the air flowing through them. Pinch valves are valves controllable by compressed air or by negative pressure.

The above-mentioned control unit 90, only indicated schematically in FIG. 1, is used to control the operation of the dense phase powder pump 1. The control unit 90 is designed to applicably control the individually controllable components of the powder feed device 100, particularly the control valves V1, V2, V3, V4 and V5, and coordinate their actuation.

According to the present invention, the control unit 90 is in particular designed to applicably control the controllable components of the powder feed device 100 so as to alternately operate the dense phase powder pump in a powder feed operating mode or a flushing operating mode. It is hereby essential to the invention for the control unit to be designed to preferably automatically, and even more preferentially, selectively automatically, regulate the pressure for closing powder inlet valve 7 and/or powder outlet valve 8 as a function of the respective operating mode of the dense phase powder pump 1.

It is hereby for example conceivable for different actuating pressure target values to be preset for each pinch valve, and namely a first target value for the actuating pressure during the powder feed operating mode and a second target value for the actuating pressure during flushing operating mode. It is hereby conceivable for the first target value and the second target value to be identical for each pinch valve.

Alternatively or additionally hereto, the control unit 90 is designed to likewise regulate the pressure selected for the actuating pressure for closing powder inlet valve 7 and/or for closing powder outlet valve 8 preferably automatically, and even more preferentially selectively automatically, as a function of the pressure prevailing within feed chamber 4. It is for example conceivable in this realization for a pressure sensor to detect the pressure value of the pressure prevailing within feed chamber 4, whereby the pressure selected for the actuating pressure for closing powder inlet valve 7 and/or for closing powder outlet valve 8 is correspondingly set as a function of the detected pressure value. Alternatively or additionally hereto, it is of course also conceivable for the pressure value of the pressure prevailing in the feed chamber 4 to be determined in a different way, for example by means of a pressure sensor or other similar device provided in the compressed air supply line 59.

The control unit 90 is furthermore designed to preferably automatically, and even more preferentially, selectively automatically, regulate the pressure of the compressed gas to be introduced into the feed chamber 4 and/or the amount of compressed gas to be introduced into the feed chamber per unit of time as a function of the operating mode of the dense phase powder pump 1.

In the embodiment of the inventive powder feed device 100 depicted schematically in FIG. 1, it is particularly provided for the user of the powder feed device 100 to initially select the operating mode for the dense phase powder pump 1, for example via the control unit 90, particularly from between the powder feed operating mode and the flushing operating mode. Depending on which operating mode has been selected for the dense phase powder pump 1, the control unit 90 will then correspondingly control the individual controllable components of the powder feed device 100. These particularly also relate to the controllable components of the pressure control 91 for setting the actuating pressure for the powder inlet and powder outlet valves 7, 8 and the pressure of the compressed gas to be introduced into the feed chamber 4 and/or the amount of compressed gas to be introduced into the feed chamber per unit of time.

In the powder feed operating mode of the dense phase powder pump 1, a portion of powder is alternatingly aspirated into the feed chamber 4 of the dense phase powder pump 1 from the powder reservoir 101 through the open powder inlet valve 7. The powder outlet valve 8 is closed during this suction phase. The portion of powder previously sucked into the feed chamber 4 of the dense phase powder pump 1 is thereafter dispensed through open powder outlet valve 8 by the introduction of compressed carrier gas into the feed chamber 4. Powder inlet valve 7 is closed during this expulsion of powder from feed chamber 4.

When the dense phase powder pump 1 is operating in its flushing operating mode, however, either the powder inlet valve 7 or the powder outlet valve 8 is open while the other of the two valves 8, 7 is closed and while compressed purge gas, particularly compressed purge air, is introduced into the feed chamber 4 of the dense phase powder pump 1 simultaneously or after a delay.

In the open state of powder inlet valve 7 during the flushing operating mode of the dense phase powder pump 1, the compressed purge gas introduced into the feed chamber flows (flushes) particularly through the feed chamber 4 of the dense phase powder pump 1, the powder path between powder inlet 5 and powder inlet 7, the valve channel of the powder inlet valve 7 configured as a pinch valve, the powder channel between the powder inlet valve 7 and the powder inlet 2 of the dense phase powder pump 1 as well as a powder line 103 provided as applicable at the powder inlet 2, in consequence of which the feed chamber 4 of the dense phase powder pump 1 and its intake side section is cleaned.

When, however, the powder outlet valve 8 is open and the powder inlet valve 7 is closed during the flushing operating mode of the dense phase powder pump 1, the compressed purge gas introduced into the feed chamber 4 flushes particularly the powder chamber 4 of the dense phase powder pump 1, the powder path between the powder outlet 6 of the powder feed chamber 4 and the powder outlet valve 8, the valve channel of the powder outlet valve 8 configured as a pinch valve, the powder channel between the powder outlet valve 8 and the powder outlet 3 of the dense phase powder pump 1 as well as any applicably provided powder line 104 there may be at the powder outlet 2 of the dense phase powder pump 1 so as to clean the feed chamber of the dense phase powder pump 1 and its discharge side section.

The flushing operating mode is most efficient in terms of cleaning action when compressed air at a relatively high pressure (for example up to 6 bar) is used as the compressed purge gas. On the other hand, however, in the feed operation of the dense phase powder pump 1; i.e. its powder feed operating mode, it generally suffices to introduce the compressed carrier gas into the feed chamber 4 of the dense phase powder pump 1 at a relatively low pressure (for example up to a maximum of 3 bar).

So that the intake side of the dense phase powder pump 1 and/or the discharge side of the dense phase powder pump 1 respectively can be efficiently cleaned during the flushing operating mode, it needs to be ensured that the compressed purge gas introduced into the feed chamber 4 of the dense phase powder pump 1 will flow through the intake side section or the discharge side section of the dense phase powder pump respectively without loss. In other words, there will be efficient cleaning of the feed chamber 4 along with the intake side section of the dense phase powder pump 1, or efficient cleaning of the feed chamber 4 of the dense phase powder pump 1 along with the discharge side section respectively, when the powder outlet valve 8 or powder inlet valve 7 respectively are sealed in a gas-tight manner.

In order to ensure this and in particular to prevent the compressed purge gas under high pressure and introduced into the feed chamber 4 from being able to penetrate through closed powder inlet valve 7 and/or powder outlet valve 8, the invention provides for the pressure of the actuating pressure selected for closing the powder inlet valve 7 and/or the powder outlet valve 8 in the flushing operating mode of the dense phase powder pump 1 to be higher than the pressure of the actuating pressure of the powder inlet and powder outlet valves 7, 8 in the powder feed operating mode of dense phase powder pump 1.

Provided for this reason in the inventive powder feed device 100 is the above-mentioned pressure regulating, or pressure control 91 respectively, same comprising a control valve V7, in particular a solenoid valve, wherein said control valve V7 is fluidly connected between the compressed air source 58 and the pressure accumulator 57. The pressure control 91 further comprises a pressure sensor which detects the pressure level of the compressed actuating air for the pinch valves 7, 8 temporarily stored in the pressure accumulator 57 preferably continuously or at predefined times and/or upon predefined events. In the powder feed operating mode of the dense phase powder pump 1, the pressure of the compressed actuating air temporarily stored in the pressure accumulator 57 is regulated by means of valve V7 so as to be at a first pressure level of for example up to a maximum of 3 bar. This actuating pressure is sufficient to seal the powder inlet valve 7 configured as a pinch valve and/or the powder outlet valve 8 configured as a pinch valve in gas-tight manner during the powder feed operating mode.

In the flushing operating mode of the dense phase powder pump 1, however, the pressure level of the compressed actuating air temporarily stored in the pressure accumulator 57 is to be respectively increased since—as stated above—the powder inlet valve 7/powder outlet valve 8 need to be able to be sealed in gas-tight manner against higher pressures during the flushing operating mode of the dense phase powder pump 1. Thus, valve V7 fluidly connects the pressure accumulator 57 to the compressed air source 58 during the flushing operating mode until the pressure sensor S1 determines that the pressure of the compressed actuating air temporarily stored in the pressure accumulator 57 for the pinch valves 7, 8 is at a correspondingly higher (second) pressure, for example in a range of between 2 to 6 bar.

As already stated above, it is however of course also conceivable for the powder inlet and powder outlet valves 7, 8 respectively configured as pinch valves to be directly connectable to the compressed air source 58 via valve V7; i.e. without the interposition of pressure accumulator 57. In this case, valve V7 together with pressure sensor S1 would have to assume the pressure regulating. This can for example be realized by valve V7 being configured as a pressure regulating valve.

The control unit 90 not only adapts the pressure of the compressed actuating air for the valves 7, 8 configured as pinch valves as a function of the operating mode of the dense phase powder pump 1 but also the pressure of the compressed gas to be introduced into the feed chamber 4 of the dense phase powder pump 1 (either compressed carrier gas/compressed carrier air or compressed purge gas/compressed purge air).

Specifically, the control unit 90 comprises hereto e.g. a pressure regulating associated with pressure control 91 for the compressed gas to be introduced into the feed chamber 4 of the dense phase powder pump 1. Said pressure regulation is realized in the embodiment of the inventive powder feed device 100 schematically depicted in FIG. 1 by the air exchange opening 13, which is provided in the housing 12 of the powder feed chamber 4, being fluidly connected or connectable to the compressed air source 58 via the compressed air line 50, a throttle valve V8 serving as a throttle device and a solenoid valve V9. Depending on the operating mode selected for the dense phase powder pump 1 (powder feed operating mode or flushing operating mode), the operating pressure provided by the compressed air source 58 of, for example, 6 bar is reduced by means of the throttle valve V8 to the pressure level needed for the respective operating mode of the dense phase powder pump 1.

Specifically, the pressure control 91 schematically depicted in the FIG. 1 embodiment is designed to set the pressure of the compressed carrier gas to be introduced into the feed chamber 4 during the powder feed operating mode of the dense phase powder pump 1 so as to be up to 5 bar, and/or to set the amount of the compressed carrier gas to be introduced into the feed chamber 4 per unit of time during the powder feed operating mode of the dense phase powder pump 1 to a value of 0.2 to 4.0 $m^3/h$, and/or to set the pressure of the compressed purge gas to be introduced into the feed chamber 4 during the flushing operating mode of the dense phase powder pump 1 so as to be in a range of between 4 and 10 bar, and/or to set the amount of compressed purge gas to be introduced into the feed chamber 4 per unit of time during the flushing operating mode of the dense phase powder pump 1 to a value of 5.0 to 25 $m^3/h$. This pressure regulating is effected in the inventive embodiment depicted in FIG. 1 by means of the throttle device configured as throttle valve V8, the structure of which will be addressed in greater detail below.

On the other hand, the pressure control 91 is designed to set the pressure of the actuating pressure to be applied to the powder inlet valve 7 and/or powder outlet valve 8 during the powder feed operating mode to a range of a maximum of 3 bar and the pressure of the actuating pressure to be applied to the powder inlet valve 7 and/or powder outlet valve 8 in the flushing operating mode to a range of up to 5 bar. This is effected in particular by means of valve V7.

Even as the representation according to FIG. 1 shows only one pressure control 91 for regulating, among other things, the actuating pressures of the powder inlet and powder outlet valves 7, 8 designed as pinch valves, it is of course also conceivable to provide each pinch valve 7, 8 with its own pressure regulation.

The exemplary embodiment of the inventive powder feed device 100 depicted schematically in FIG. 2 corresponds substantially to the embodiment described above with reference to the FIG. 1 representation, although whereby a first bypass compressed air line is additionally provided here which is connected to the compressed air supply or compressed air source 58 respectively (via compressed air line 54) on one side and connectable to the air exchange opening 13 of the dense phase powder pump 1 via a further valve V6 (here: solenoid valve) on the other side. Said bypass compressed air line serves in the embodiment depicted in FIG. 2 to fluidly connect the exchange air opening 13 of the dense phase powder pump 1 directly to the compressed air source 58 in the flushing operating mode of the dense phase powder pump 1 in order to feed the compressed air provided by the compressed air source 58 directly into the feed chamber 4 of the dense phase powder pump 1.

A second bypass compressed air line 60 is further provided which is connected to the compressed air supply or compressed air source 58 respectively on one side and connectable to the air exchange opening 21 of the auxiliary compressed air inlet device 9 on the other side by means of a further valve V10 (here: solenoid valve). This bypass compressed air line 60 serves in the embodiment depicted in FIG. 2 to fluidly connect the air exchange opening 21 of the auxiliary compressed air inlet device 9 directly to the compressed air source 58 during the flushing operating mode of the dense phase powder pump 1 in order to feed the compressed air provided by the compressed air source 58 directly into the auxiliary compressed air inlet device 9.

In this alternative embodiment, the throttle valve V8 only reduces the operating pressure of the compressed air provided by the compressed air source 58 during the powder feed operating mode of the dense phase powder pump 1.

As indicated above, the inventive solution makes use of the throttle valve V8 as the throttle device of pressure control 91. Said throttle valve V8 is preferably designed so as to regulate the cross-sectional flow of the compressed gas line 50 fluidly connected or connectable to the feed chamber 4 of the dense phase powder pump 1 on a localized basis as needed in order to thereby vary the amount of compressed gas fed to the feed chamber 4 per unit of time and/or the pressure of the actuating pressure to be applied to the exchange air opening 13, or adapt same to the respective operating mode of the dense phase powder pump 1.

In accordance with one preferential realization of the throttle device used in the inventive powder feed device 100, the throttle valve V8 is configured in the form of a control valve, wherein the throttle valve V8 serves to set the pressure of the compressed carrier gas to be introduced into the feed chamber 4 during the powder feed operating mode and/or to set an amount of compressed carrier gas to be introduced into the feed chamber 4 per unit of time during the powder feed operating mode. It is hereby advantageous for the at least one throttle valve V8 to be further designed to set the pressure of the compressed purge gas to be introduced into the feed chamber 4 during the flushing operating mode and/or set an amount of compressed purge gas to be introduced into the feed chamber 4 per unit of time during the flushing operating mode.

In conjunction hereto, it is conceivable for the throttle valve V8 to comprise a fixed valve, particularly a valve seat, and a valve part which is movable relative thereto and thus adjustable, particularly a valve needle, to change the opening width of a throttle duct of the throttle valve V8, wherein the geometrical form of the adjustable valve part (valve needle) is selected such that the throttle valve V8 exhibits a flow characteristic having at least two substantially linear ranges. Said at least two substantially linear ranges of the flow characteristic thereby exhibit different gradients.

Reference is made in conjunction hereto to the representation provided in FIG. 3, which depicts an exemplary embodiment of a valve needle head 70 of a valve part which is displaceable relative to a valve seat of the throttle valve V8 (not shown) in order to thereby set the opening width of a throttle duct formed in the valve seat. What is hereby essential is for the valve needle head 70 depicted as an example in FIG. 2 to be geometrically designed so as to be able to realize a flow characteristic having two substantially linear ranges, whereby said two linear ranges exhibit different gradients.

Illustrative hereto is the representation provided in FIG. 4 which shows an exemplary flow characteristic of a throttle valve V8 which makes use of a valve needle head 70 according to the FIG. 2 representation. It is clearly recognizable from the flow characteristic depicted in FIG. 4 that same has two substantially linear ranges A1, A2, whereby these two substantially linear ranges A1, A2 exhibit clearly different gradients.

The control unit 90 is preferably designed according to the present invention to control the throttle valve V8 such that the compressed gas flow through the throttle valve V8 is within the first substantially linear range A1 of the flow characteristic during the powder feed operating mode of the dense phase powder pump 1, wherein the control unit 90 controls the throttle valve V8 during the flushing operating mode of the dense phase powder pump 1 such that the compressed gas flow through the throttle valve V8 lies within the second substantially linear range A2 of the flow characteristic. By so doing, it is possible to realize two different pressure levels for the compressed gas to be introduced into the feed chamber 4 of the dense phase powder pump 1 with one single valve (throttle valve V8) so as to be able to dispense with the valve V6, configured for example as a solenoid valve, as used in the pneumatic diagram of FIG. 2.

The throttle valve V8 is preferably controllable via an actuator, particularly an electric actuator, controllable by the control unit 90 for the purpose of regulating the flow of compressed gas through the throttle valve V8 by moving the movable valve part (valve needle head 70) relative to the fixed valve part (valve seat).

The invention is not limited to the embodiments depicted as examples in the drawings but rather yields from an overall synopsis of all the features disclosed herein considered together in context.

It is particularly conceivable in conjunction hereto for the throttle device of the pressure control 91 to not comprise a throttle valve V8 as in the embodiment described above but rather an adjustable butterfly valve which can be controlled by the control unit 90 such that it can be moved into at least two predefined or definable positions, wherein each predefined or definable position of the butterfly valve corresponds to a defined flow rate of compressed gas able to pass through the throttle device.

The invention claimed is:

1. A method for selectively operating a dense phase powder pump in a powder feed operating mode or a flushing operating mode, wherein the dense phase powder pump comprises at least one feed chamber having a powder inlet valve and a powder outlet valve, and wherein the powder inlet valve and the powder outlet valve are each designed as a pneumatically operating pinch valve configured to be closeable upon application of a selected actuating pressure, wherein the actuating pressure selected to close the powder inlet valve and/or powder outlet valve is set:
as a function of the operating mode of the dense phase powder pump;
as a function of a pressure prevailing within the feed chamber;
as a function of an amount of compressed carrier gas supplied to the feed chamber per unit of time in the powder feed operating mode; and/or as a function of an amount of coating powder conveyed by the dense phase powder pump per unit of time in the powder feed operating mode.

2. The method according to claim 1, wherein the pressure of the compressed carrier gas to be introduced into the feed chamber and/or the amount of the compressed carrier gas to be introduced into the feed chamber per unit of time is set as a function of the operating mode of the dense phase powder pump.

3. The method according to claim 1, wherein during the powder feed operating mode, a portion of powder is alternatingly sucked into the feed chamber through the opened powder inlet valve while the powder outlet valve is closed, and the portion of powder previously sucked into the feed chamber is discharged through the open powder outlet valve by the introduction of the compressed carrier gas into the feed chamber while the powder inlet valve is closed.

4. The method according to claim 1, wherein during the flushing operating mode, either the powder inlet valve or the powder outlet valve is open while the other of the two valves is closed, and wherein compressed purge gas is introduced into the feed chamber simultaneously or after a delay.

5. The method according to claim 1, wherein the powder inlet valve and the powder outlet valve are each designed as a pinch valve, wherein the actuating pressure from the compressed actuating gas introduced into the pressure chamber can squeeze the hose and the valve channel can thereby be closed.

6. The method according to claim 1, wherein the following operating cycle a) to d) is repeated during the powder feed operating mode:
   a) generating a negative pressure in the feed chamber to suck a portion of powder into the feed chamber through the opened powder inlet valve while the powder outlet valve is closed;
   b) closing the powder inlet valve and opening the powder outlet valve;
   c) introducing the compressed carrier gas into the feed chamber to dispense the portion of powder sucked therein in step a) out of the feed chamber through the open powder outlet valve while the powder inlet valve is closed; and
   d) closing the powder outlet valve and opening the powder inlet valve.

7. The method according to claim 6, wherein the actuating pressure selected to close the powder inlet valve and/or powder outlet valve is set to the amount of the compressed carrier gas introduced into the feed chamber per unit of time in method step c).

8. The method according claim 1, wherein the following operating cycle i) and ii) is implemented during the flushing operating mode:
   i) closing the powder outlet valve and opening the powder inlet valve; and
   ii) introducing compressed purge gas into the feed chamber to flush the feed chamber and an intake side of the dense phase powder pump.

9. The method according to claim 8, wherein the following operating cycle iii) and iv) is implemented during the flushing operating mode:
   iii) closing the powder inlet valve and opening the powder outlet valve; and
   iv) introducing compressed purge gas into the feed chamber to flush the feed chamber and a powder discharge side of the dense phase powder pump.

10. The method according to claim 8, wherein operating cycle i) and ii) and operating cycle ii) and iv) are implemented at different times.

11. The method according to claim 1, wherein the method further comprises the following steps:
   setting the pressure of the compressed carrier gas to be introduced into the feed chamber during the powder feed operating mode; and/or
   setting an amount of the compressed carrier gas to be supplied to the feed chamber per unit of time during the powder feed operating mode; and/or
   setting the pressure of a compressed purge gas to be introduced into the feed chamber during the flushing operating mode; and/or
   setting an amount of the compressed purge gas to be supplied to the feed chamber per unit of time during the flushing operating mode; and/or
   setting the actuating pressure to be applied to the powder inlet valve and/or powder outlet valve during the powder feed operating mode; and/or
   setting the actuating pressure to be applied to the powder inlet valve and/or powder outlet valve during the flushing operating mode.

12. The method according to claim 11,
   wherein the pressure of the compressed carrier gas to be introduced into the feed chamber during the powder feed operating mode is set in a range of up to a maximum of 5 bar; and/or
   wherein the amount of the compressed carrier gas to be supplied to the feed chamber per unit of time during the powder feed operating mode is set to a value of 0.2 to 4.0 $m^3/h$; and/or
   wherein the pressure of the compressed purge gas to be introduced into the feed chamber during the flushing operating mode is to be set in a range of between 4 to 10 bar; and/or
   wherein the amount of compressed purge gas to be supplied to the feed chamber during the flushing operating mode is set to a value of 5.0 to 25.0 $m^3/h$.

13. The method according to claim 11, wherein the pressure of the actuating pressure to be applied to the powder inlet valve and/or powder outlet valve during the powder feed operating mode is set to a maximum of 3 bar; and/or
   wherein the pressure of the actuating pressure to be applied to the powder inlet valve and/or powder outlet valve during the flushing operating mode is set to a range of between 2 and 5 bar.

14. The method according to claim 11, wherein a cross-sectional flow of a compressed gas line fluidly connected or connectable to the feed chamber is set so as to regulate pressure on a localized basis.

15. A powder feed device for coating powder, wherein the powder feed device comprises the following:
   a dense phase powder pump comprising at least one feed chamber having a powder inlet valve and a powder outlet valve; and
   a control unit that selectively operates the dense phase powder pump in a powder feed operating mode or a flushing operating mode,
   wherein the powder inlet valve and the powder outlet valve are each designed as a pneumatically operating pinch valve configured to be closeable upon application of a selected actuating pressure, the actuating pressure selected to close the powder inlet valve and/or powder outlet valve being set:

as a function of the operating mode of the dense phase powder pump;

as a function of a pressure prevailing within the feed chamber;

as a function of an amount of compressed carrier gas supplied to the feed chamber per unit of time in the powder feed operating mode; and/or as a function of an amount of coating powder conveyed by the dense phase powder pump per unit of time in the powder feed operating mode.

16. The powder feed device according to claim 15, wherein the powder feed device further comprises a pressure control having at least one throttle device to set a cross-sectional flow of a compressed gas line fluidly connected or connectable to the feed chamber on a localized basis.

17. The powder feed device according to claim 16, wherein the throttle device comprises at least one throttle valve, in the form of a regulating valve, which is designed to set a pressure for the compressed carrier gas to be introduced into the feed chamber during the powder feed operating mode and/or to set an amount of the compressed carrier gas to be introduced into the feed chamber per unit of time during the powder feed operating mode.

18. The powder feed device according to claim 17, wherein the throttle valve comprises a fixed valve part, in the form of a valve seat, and a valve part-which is movable relative thereto and can thereby be regulated to change an opening width of a throttle duct of the at least one throttle valve, wherein a geometrical form of the adjustable valve part-is selected such that the throttle valve-exhibits a flow characteristic having at least two substantially linear ranges, wherein the at least two substantially linear ranges of the flow characteristic have predefined and different gradients.

19. The powder feed device according to claim 17, wherein the at least one throttle valve is further allocated an actuator, controllable by the control unit for regulating the flow of compressed gas through said throttle valve by moving the movable valve part relative to the fixed valve part.

20. The powder feed device according to claim 16, wherein the throttle device comprises an adjustable butterfly valve which can be controlled by the control unit such that it can be moved into at least two predefined or definable positions, wherein each predefined or definable position of the butterfly valve corresponds to a defined rate of compressed gas flow able to pass through the throttle device.

* * * * *